United States Patent
Makled et al.

(10) Patent No.: US 9,664,594 B2
(45) Date of Patent: May 30, 2017

(54) AMBIENT HUMIDITY DETECTION TRANSMISSION SHIFTS

(71) Applicant: Ford Global Technologies, LLC, Dearborn, MI (US)

(72) Inventors: Daniel A. Makled, Dearborn, MI (US); Gopichandra Surnilla, West Bloomfield, MI (US); Jeffrey Allen Doering, Canton, MI (US); Brian Shu, Canton, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 14/626,193

(22) Filed: Feb. 19, 2015

(65) Prior Publication Data
US 2016/0245190 A1 Aug. 25, 2016

(51) Int. Cl.
*B60W 10/06* (2006.01)
*G01M 15/04* (2006.01)
(Continued)

(52) U.S. Cl.
CPC .......... *G01M 15/042* (2013.01); *B60W 10/06* (2013.01); *B60W 10/10* (2013.01); *B60W 30/18072* (2013.01); *F02D 13/06* (2013.01); *F02D 41/0005* (2013.01); *F02D 41/123* (2013.01); *F02D 41/1454* (2013.01); *B60W 2510/0604* (2013.01); *B60W 2510/0623* (2013.01); *B60W 2550/12* (2013.01); *B60W 2710/0605* (2013.01); *B60W 2710/1005* (2013.01); *F02D 41/005* (2013.01); *F02D 41/008* (2013.01); *F02D 41/023* (2013.01);
(Continued)

(58) Field of Classification Search
CPC ............. Y10T 477/675; Y10T 477/677; Y10T 477/65; F02D 17/02; G01M 15/042; B60W 10/06; B60W 10/10; B60W 30/18072; B60W 2550/12; B60W 2710/0605; B60W 2510/0604
See application file for complete search history.

(56) References Cited

U.S. PATENT DOCUMENTS

| 6,016,796 A | 1/2000 | Dalton |
|---|---|---|
| 8,495,996 B2 | 7/2013 | Soltis et al. |

(Continued)

OTHER PUBLICATIONS

Surnilla, G. et al., "Methods and Systems for Operating a Variable Voltage Oxygen Sensor," U.S. Appl. No. 14/517,601, filed Oct. 14, 2014, 42 pages.
(Continued)

*Primary Examiner* — Roger Pang
(74) *Attorney, Agent, or Firm* — Julia Voutyras; McCoy Russell LLP (57) ABSTRACT

Various method for operating an engine responsive to transmission shifts under non-fueling conditions are provided. In one example, a method of operating an internal combustion engine comprises deactivating at least one engine cylinder, performing a diagnostic while the at least one engine cylinder is deactivated and while the engine is operating under high load, predicting a transmission shift, and responsive to the predicted transmission shift, reducing engine load below the high load and terminating the diagnostic.

20 Claims, 6 Drawing Sheets

(51) Int. Cl.
*B60W 10/10* (2012.01)
*B60W 30/18* (2012.01)
*F02D 41/12* (2006.01)
*F02D 41/14* (2006.01)
*F02D 13/06* (2006.01)
*F02D 41/00* (2006.01)
*F02D 41/02* (2006.01)
*F02P 5/15* (2006.01)
*F02D 21/08* (2006.01)

(52) U.S. Cl.
CPC .... *F02D 41/1456* (2013.01); *F02D 2021/083* (2013.01); *F02D 2041/1412* (2013.01); *F02D 2200/0418* (2013.01); *F02P 5/1502* (2013.01); *Y02T 10/18* (2013.01); *Y02T 10/42* (2013.01); *Y10T 477/65* (2015.01); *Y10T 477/675* (2015.01); *Y10T 477/677* (2015.01)

(56) References Cited

U.S. PATENT DOCUMENTS

| | | | |
|---|---|---|---|
| 8,522,760 | B2 | 9/2013 | Soltis |
| 8,603,310 | B2 | 12/2013 | Ishida et al. |
| 8,731,806 | B2 | 5/2014 | Soltis et al. |
| 8,857,155 | B2 | 10/2014 | Surnilla et al. |
| 8,974,346 | B2* | 3/2015 | Glugla .................... F16H 61/16 477/115 |
| 9,017,217 | B2 | 4/2015 | Norman et al. |
| 2010/0012053 | A1* | 1/2010 | Surnilla ................. B60W 10/11 123/21 |
| 2013/0096761 | A1* | 4/2013 | Kuroda .................... B60K 6/48 701/22 |
| 2013/0184949 | A1* | 7/2013 | Saito ...................... B60W 10/11 701/58 |
| 2014/0045652 | A1* | 2/2014 | Carlson ................. B60W 10/06 477/109 |
| 2014/0156172 | A1 | 6/2014 | Surnilla et al. |
| 2014/0202437 | A1 | 7/2014 | Surnilla et al. |
| 2014/0238368 | A1 | 8/2014 | Jammoussi et al. |
| 2014/0345584 | A1 | 11/2014 | Jammoussi et al. |
| 2015/0101328 | A1 | 4/2015 | Surnilla et al. |
| 2015/0121864 | A1 | 5/2015 | Surnilla et al. |
| 2016/0101768 | A1* | 4/2016 | Mori ..................... B60W 10/06 701/54 |

OTHER PUBLICATIONS

Surnilla, G. et al., "Methods and Systems for Fuel Ethanol Content Determination via an Oxygen Sensor," U.S. Appl. No. 14/151,574, filed Jan. 9, 2014, 31 pages.

Surnilla, G. et al., "Methods and Systems for Fuel Ethanol Content Determination via an Oxygen Sensor," U.S. Appl. No. 14/297,301, filed Jun. 5, 2014, 35 pages.

Demarco, J. et al., "Engine Speed Control Via Alternator Load Shedding," U.S. Appl. No. 14/614,881, filed Feb. 5, 2015, 50 pages.

Macneille, P. et al., "System and Method for Estimating Ambient Humidity," U.S. Appl. No. 14/286,631, filed May 23, 2014, 50 pages.

Vigild, C. et al., "Methods and Systems for Fuel Canister Purge Flow Estimation with an Intake Oxygen Sensor," U.S. Appl. No. 14/155,261, filed Jan. 14, 2014, 51 pages.

Surnilla, G. et al., "Methods and Systems for Humidity Determination via an Oxygen Sensor," U.S. Appl. No. 14/626,308, filed Feb. 15, 2015, 40 pages.

Makled, D. et al., "Methods and Systems for Estimating Air-Fuel Ratio with a Variable Voltage Oxygen Sensor," U.S. Appl. No. 14/626,542, filed Feb. 19, 2015, 47 pages.

Makled, D. et al., "Methods and System for Fuel Ethanol Content Estimation and Engine Control," U.S. Appl. No. 14/626,623, filed Feb. 19, 2015, 68 pages.

* cited by examiner

AMBIENT HUMIDITY DETECTION TRANSMISSION SHIFTS

FIELD

The field of the disclosure relates to detecting ambient humidity via an oxygen sensor.

BACKGROUND AND SUMMARY

Intake and/or exhaust gas sensors may be operated to provide indications of various gas constituents. Output from an oxygen sensor, for example, may be used to determine the air-fuel ratio (AFR) of exhaust gas. An oxygen sensor may be disposed in an engine intake passage to determine the concentration of exhaust gas recirculation (EGR) gasses in intake charge air. Indications of AFR may be used to adjust various engine operating parameters such as fueling and a target AFR, for example. In particular, exhaust gas AFR may be controlled to achieve the target AFR in order to maximize operating efficiency of an emission control device. An oxygen sensor may alternatively or additionally be used to detect ambient humidity, with one or more engine operating parameters being adjusted based on the detected ambient humidity.

In some approaches, an oxygen sensor is used to detect ambient humidity during engine non-fueling conditions such as deceleration fuel shut-off (DFSO). As the ingestion of hydrocarbons by the oxygen sensor, resulting for example from flow of positive crankcase ventilation (PCV) gasses, may confound ambient humidity measurement and degrade aspects of engine operation based thereon, an intake throttle of the engine may be opened to reduce PCV flow and increase ambient airflow.

The inventors herein have recognized an issue with the approach identified above. Specifically, a transmission may downshift during coast down during DFSO. When performing the shift while the engine operates under relatively high load, drivability of an associated vehicle may be degraded and/or noise, vibration, and harshness (NVH) may occur.

One approach that at least partially addresses the above issues includes a method of operating an internal combustion engine comprising deactivating at least one engine cylinder, performing a diagnostic while the at least one engine cylinder is deactivated and while the engine is operating under high load, predicting a transmission shift, and responsive to the predicted transmission shift, reducing engine load below the high load and terminating the diagnostic.

In a more specific example, predicting the transmission shift includes determining whether a transmission shift request flag has been set in an engine controller, the flag indicating whether the transmission shift will occur.

In another example, the diagnostic detects ambient humidity via an oxygen sensor. In this way, degraded drivability and/or NVH may be reduced or obviated when performing a transmission shift following non-fueling conditions, while allowing ambient humidity to be detected under suitable conditions. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
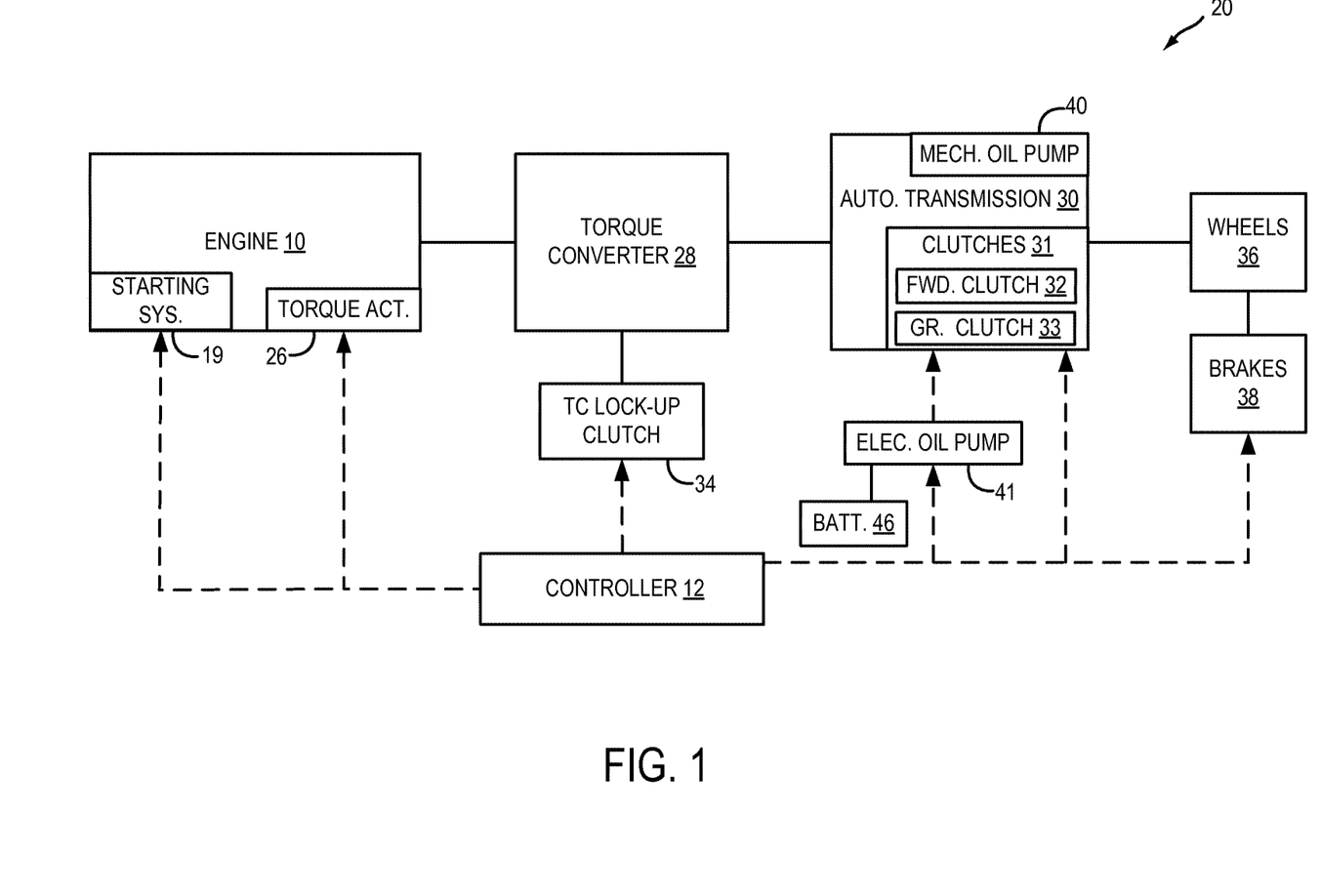
FIG. 1 is a block diagram of a vehicle drive-train.
Figure 2:
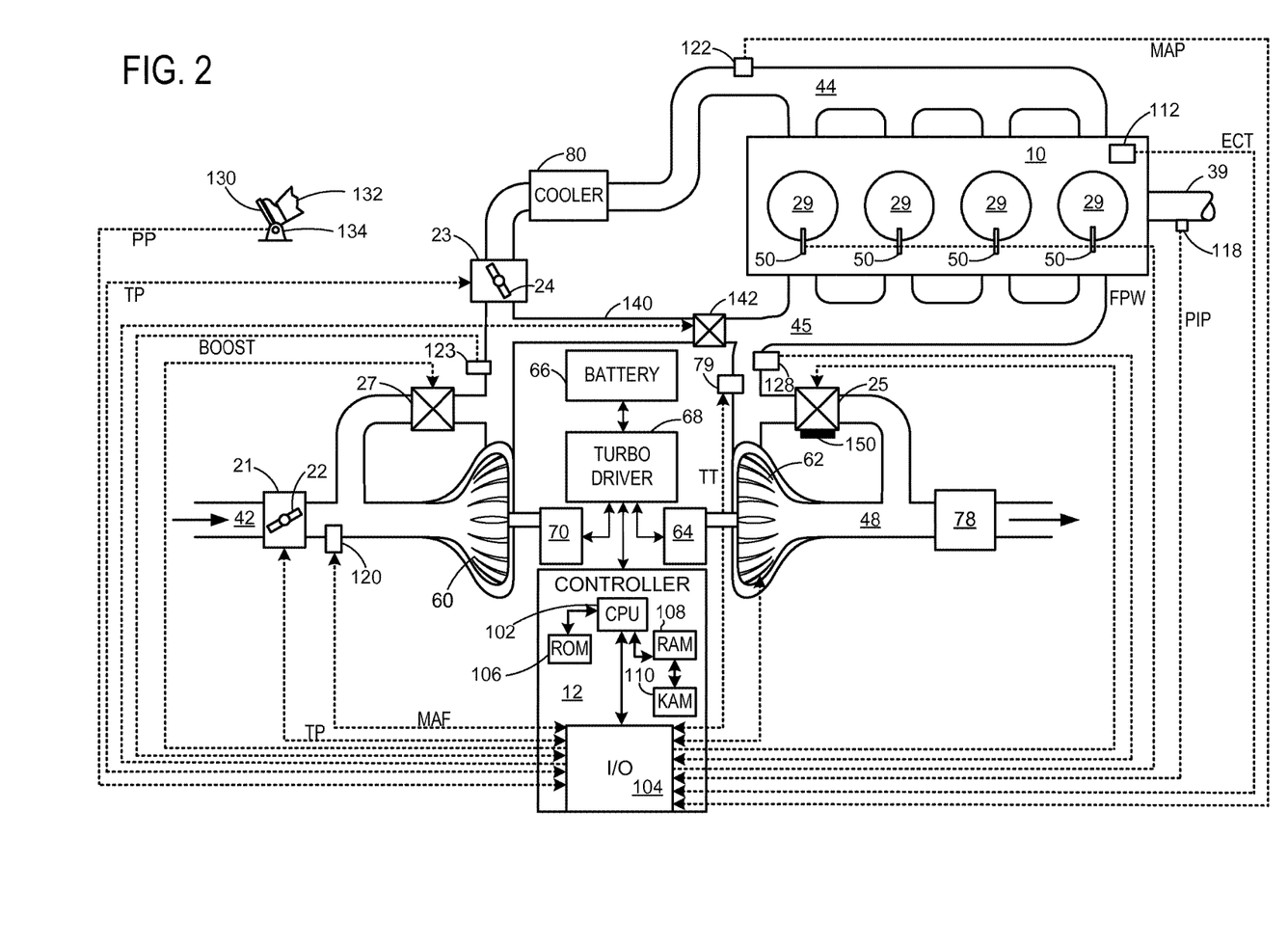
FIG. 2 is a schematic diagram showing aspects of the engine of FIG. 1.
Figure 3:
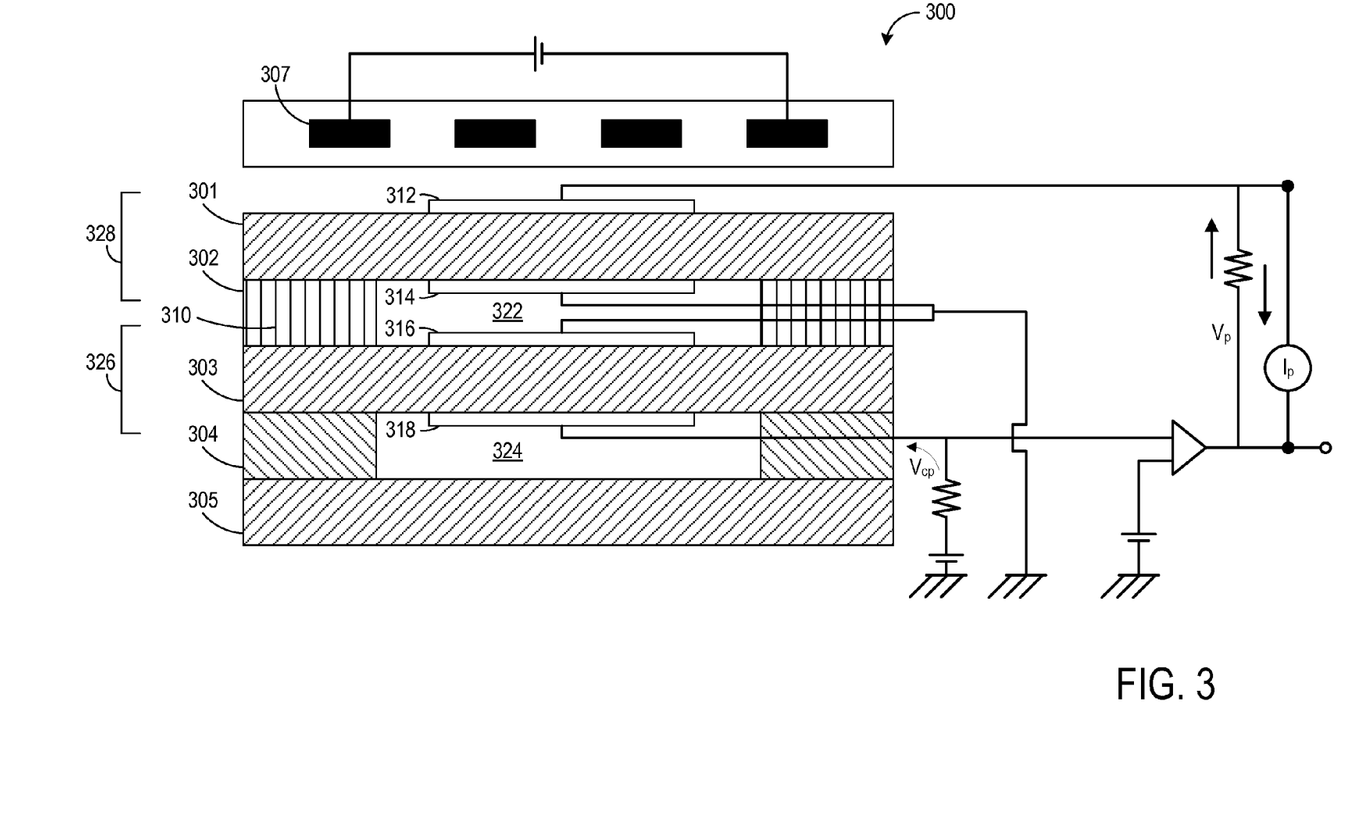
FIG. 3 shows a schematic view of an example oxygen sensor.
Figure 4:
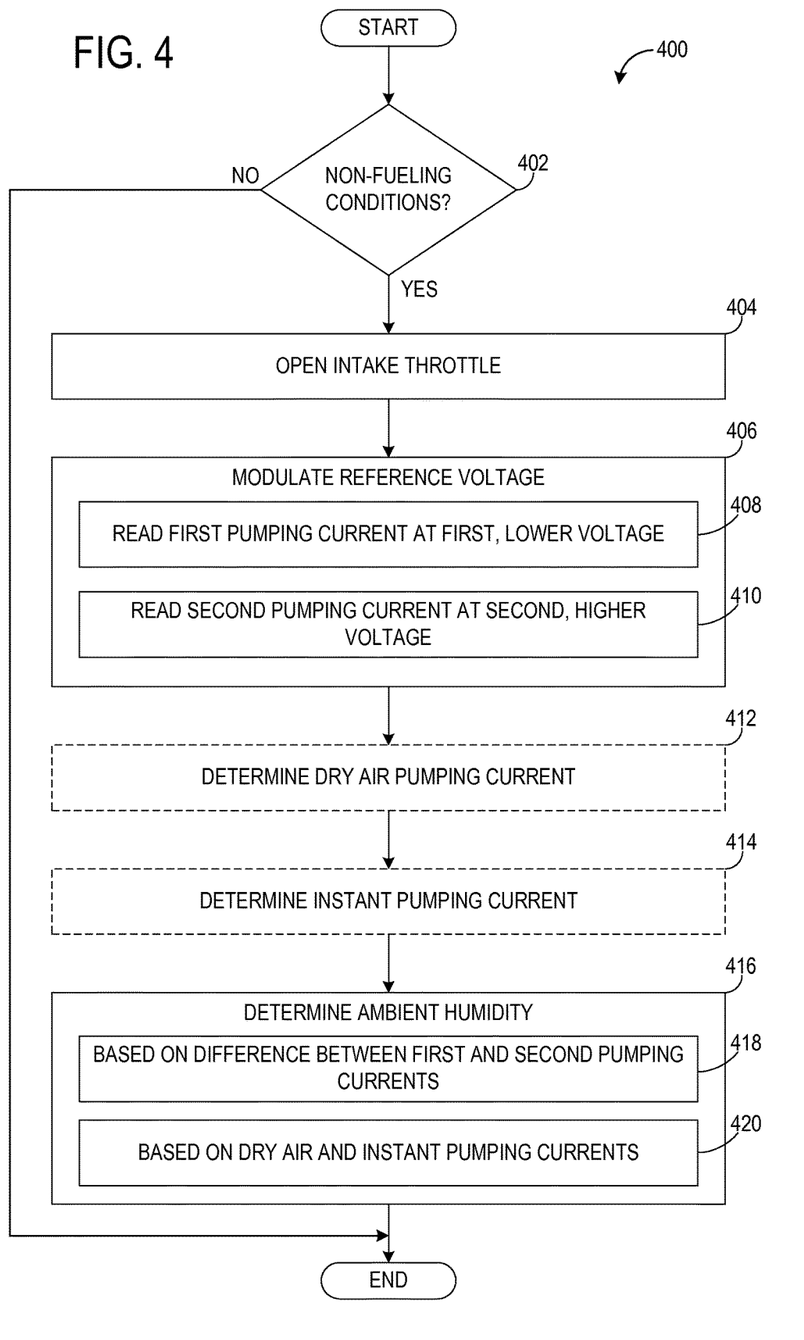
FIG. 4 shows a flowchart illustrating a method of determining ambient humidity via the oxygen sensor of FIG. 3.
Figure 5:
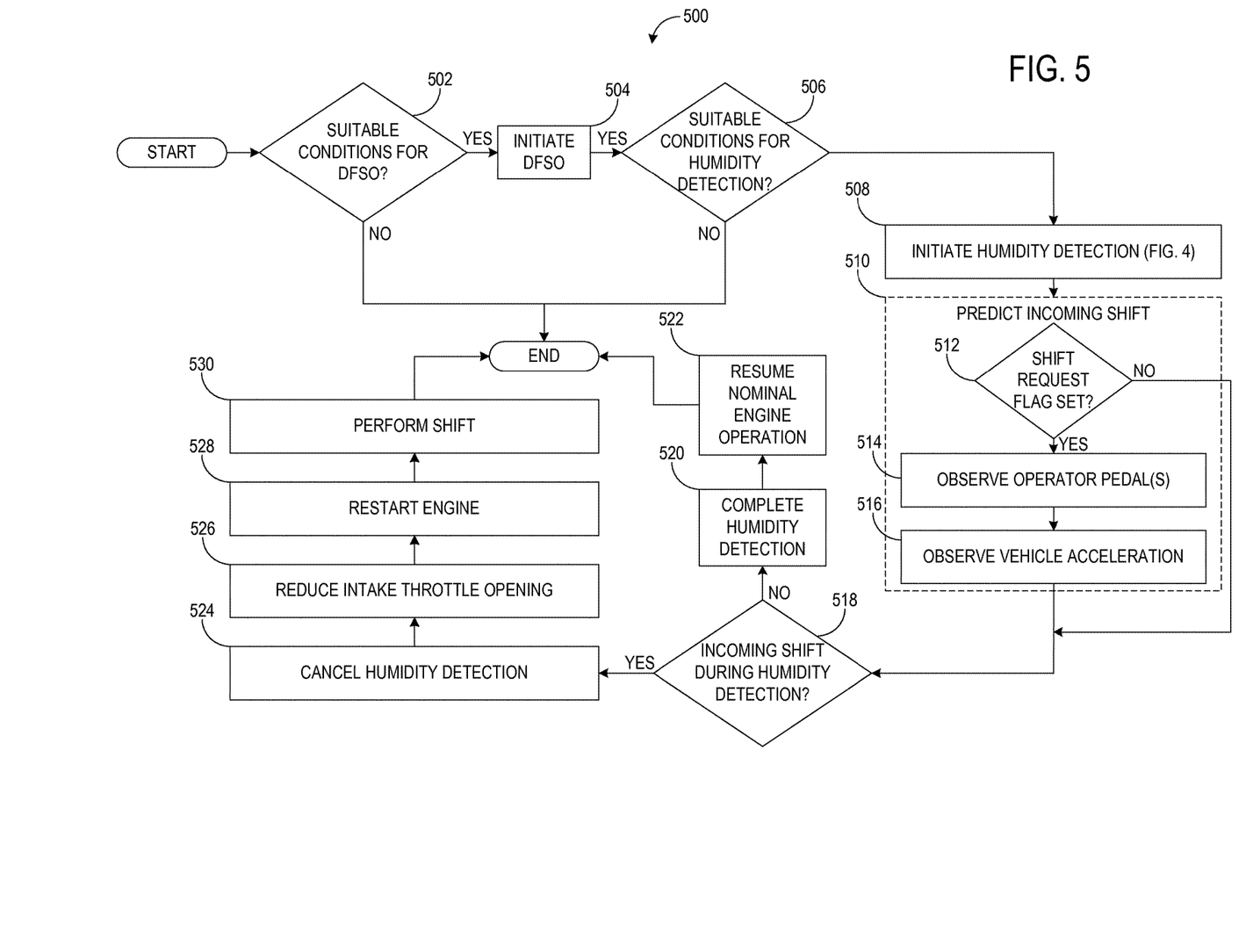
FIG. 5 shows a flowchart illustrating a method of controlling operation of the engine of FIG. 2 responsive to transmission shifts during DFSO.
Figure 6:
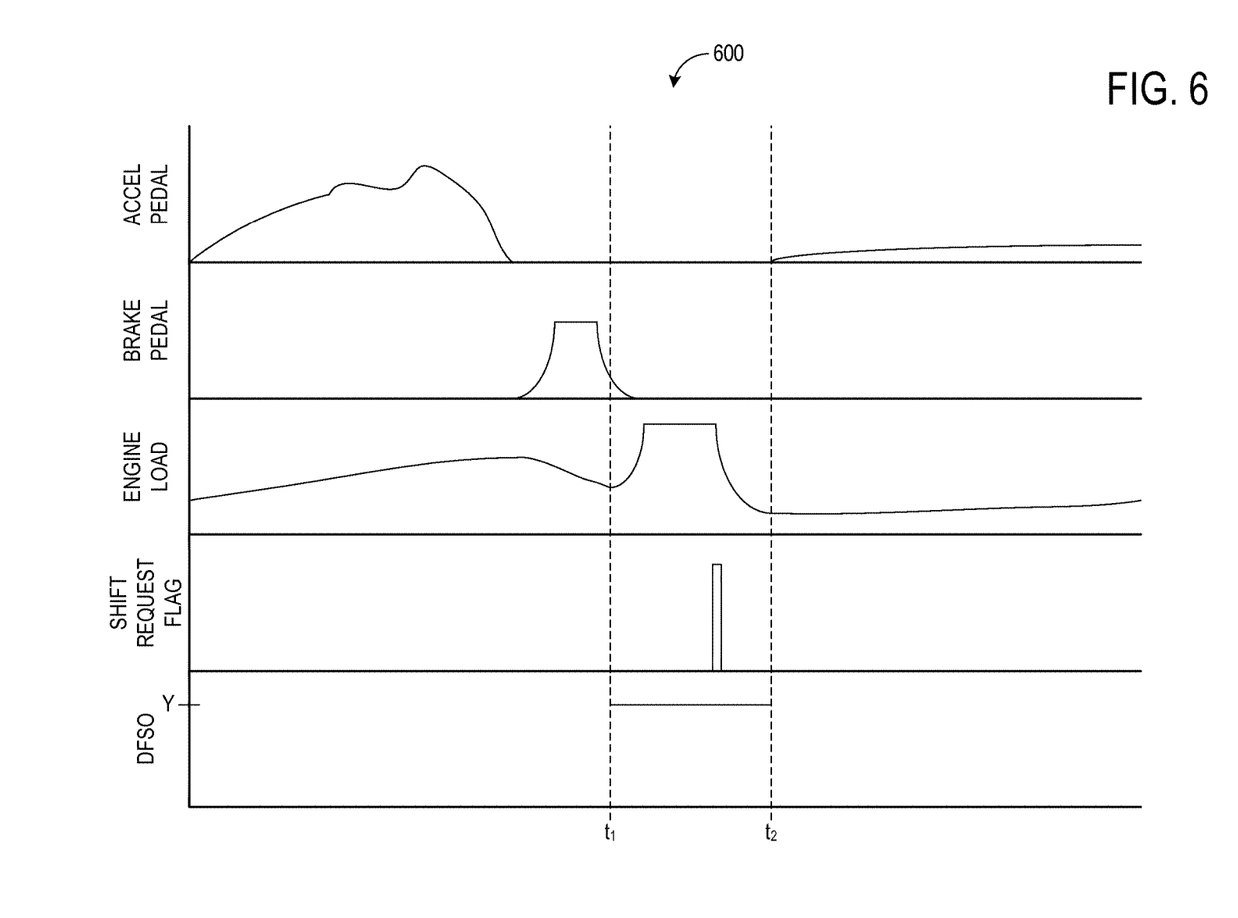
FIG. 6 shows a graph of an exemplary drive cycle.

Various methods for operating an engine responsive to transmission shifts under non-fueling conditions are provided. In one example, a method of operating an internal combustion engine comprises deactivating at least one engine cylinder, performing a diagnostic while the at least one engine cylinder is deactivated and while the engine is operating under high load, predicting a transmission shift, and responsive to the predicted transmission shift, reducing engine load below the high load and terminating the diagnostic. FIG. 1 is a block diagram of a vehicle drive-train, FIG. 2 is a schematic diagram showing aspects of the engine of FIG. 1, FIG. 3 shows a schematic view of an example oxygen sensor, FIG. 4 shows a flowchart illustrating a method of determining ambient humidity via the oxygen sensor of FIG. 3, FIG. 5 shows a flowchart illustrating a method of controlling operation of the engine of FIG. 2 responsive to transmission shifts during DFSO, and FIG. 6 shows a graph of an exemplary drive cycle. The engine of FIG. 2 also includes a controller configured to carry out the methods depicted in FIGS. 4 and 5.

FIG. 1 is a block diagram of a vehicle drive-train 20. Drive-train 20 may be powered by engine 10. Engine 10 may be started with an engine starting system 19 including a motor-driven starter, for example. The starter motor may be operated using current from battery 46, for example. Further, engine 10 may generate or adjust torque via torque actuator 26, such as a fuel injector, throttle, etc.

An engine output torque may be transmitted to torque converter 28 to drive an automatic transmission 30. Further, one or more clutches 31 may be engaged, including forward clutch 32, to propel a vehicle. In one example, the torque converter 28 may be referred to as a component of the transmission 30. Transmission 30 may include a plurality of gear clutches 33 that may be engaged as needed to activate a plurality of fixed transmission gear ratios. Specifically, by adjusting the engagement of the plurality of gear clutches 33, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. As elaborated herein, a controller may vary the transmission gear (e.g., upshift or downshift the transmission gear) to adjust an amount of torque conveyed across the transmission and torque converter to vehicle wheels 36 (that is, an engine shaft output torque).

Likewise, under selected conditions, one or more clutches 31 may be applied to tie-up the transmission to a transmission case or housing, and thereby to a frame of the vehicle. The tie-up may be a "hard" tie-up with a higher tie-up torque. Alternatively, the tie-up may be a "soft" tie-up wherein one or more of the clutches are slipped to apply a lower tie-up torque.

The output of the torque converter may be controlled by torque converter lock-up clutch 34. For example, when torque converter lock-up clutch 34 is fully disengaged, torque converter 28 transmits engine torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter clutch to an input shaft (not shown) of transmission 30. Alternatively, the torque converter lock-up clutch 34 may be partially engaged, thereby enabling the amount of torque relayed to the transmission to be adjusted. A controller 12 may be configured to adjust the amount of torque transmitted by torque converter 28 by adjusting the torque converter lock-up clutch in response to various engine operating conditions, or based on a driver-based engine operation request. In one example, an engine operation request may be received from the vehicle operator via an accelerator pedal and/or a brake pedal (shown in FIG. 2). Torque output from the automatic transmission 30 may in turn be relayed to wheels 36 to propel the vehicle. Specifically, automatic transmission 30 may transfer an input driving torque at the input shaft (not shown) responsive to a vehicle traveling condition before transmitting an output driving torque to the wheels.

Further, a frictional force may be applied to wheels 36 by engaging wheel brakes 38. In one example, wheel brakes 38 may be engaged in response to the driver pressing his foot on a brake pedal. In the same way, a frictional force may be reduced to wheels 36 by disengaging wheel brakes 38 in response to the driver releasing his foot from the brake pedal. Further, vehicle brakes may apply a frictional force to wheels 36 as part of an automated engine stopping procedure. In some examples, the transmission may be tied-up to a transmission housing to assist the vehicle brakes in holding the vehicle stationary.

A mechanical oil pump 40 may be in fluid communication with automatic transmission 30 to provide hydraulic pressure to engage the various clutches 31, such as forward clutch 32, gear clutches 33, and/or torque converter lock-up clutch 34. Mechanical oil pump 40 may be operated in accordance with torque converter 28, and may be driven by the rotation of the engine or transmission input shaft, for example. Thus, the hydraulic pressure generated in mechanical oil pump 40 may increase as an engine speed increases, and may decrease as an engine speed decreases. An electric oil pump 41, also in fluid communication with the automatic transmission but operating independent from the driving force of engine 10 or transmission 30, may be provided to supplement the hydraulic pressure of the mechanical oil pump 40. Electric oil pump 41 may be driven by an electric motor (not shown) to which an electric power may be supplied, for example by battery 46.

A controller 12 may be configured to receive inputs from engine 10, as shown in more detail in FIG. 2, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. Engine control may be performed on a cylinder-by-cylinder basis to control the engine torque output (e.g., in all cases).

As alluded to above, controller 12 may be further configured to vary the transmission gear (e.g., upshift or downshift the transmission gear) of transmission 30 to adjust an amount of torque conveyed across the transmission and torque converter 28 to vehicle wheels 36. In some examples, controller 12 may set a transmission shift request flag upon determining that a shift should occur. The transmission shift request flag may be a binary variable indicating whether or not a transmission shift is requested, for example. A delay may exist between the time at which the transmission shift request flag is set and the time at which transmission 30 is shifted in response to setting of the flag, for example due to the time taken to stroke clutch 34 and unlock torque converter 28. This delay can be leveraged to mitigate or obviate issues that may otherwise occur when shifting gears under certain engine operating conditions. For example, an engine routine described in further detail below with reference to FIG. 5 may be executed during which engine 10 is operated with a high load after being restarted following deceleration fuel shut-off (DFSO), so as to prevent the engine from stalling when torque convertor 28 is unlocked for an incoming shift. Performing the shift in the presence of high engine torque resulting from the high engine load, however, may degrade vehicle drivability and introduce noise, vibration, and harshness (NVH). In particular, air residing in engine cylinders may provide a negative torque that impedes the shift. To address these issues, the engine load may be reduced upon determining that the transmission shift request flag has been set in controller 12, as the delay between the time at which the flag is set and the time at which transmission 30 is shifted may be sufficiently long to reduce the engine load and mitigate or obviate degraded drivability and NVH.

Controller 12 may stipulate a shift and set the transmission shift request flag based on various engine and vehicle operating parameters, including but not limited to the current transmission gear, engine speed, and accelerator pedal position—for example, threshold changes in the accelerator pedal position in a suitable duration may prompt a shift.

FIG. 2 is a schematic diagram showing aspects of engine 10 of FIG. 1. The engine 10 is shown with four cylinders 29. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 29 of engine 10 may include combustion chamber walls with a piston (not shown) positioned therein. The pistons may be coupled to a crankshaft 39 so that reciprocating motion of the piston is translated into rotational motion of the crankshaft. Crankshaft 39 may be coupled to at least one drive wheel of a vehicle via transmission 30, for example. Further, a starter motor may be coupled to crankshaft 39 via a flywheel to enable a starting operation of engine 10.

Combustion chambers 29 may receive intake air from intake manifold 44 via intake passage 42 and may exhaust combustion gasses via exhaust passage 48. Intake manifold 44 and exhaust manifold 45 can selectively communicate with combustion chamber 29 via respective intake valves and exhaust valves (not shown). In some embodiments, combustion chamber 29 may include two or more intake valves and/or two or more exhaust valves.

Fuel injectors 50 are shown coupled directly to combustion chamber 29 for injecting fuel directly therein in proportion to the pulse width of signal FPW received from controller 12. In this manner, fuel injector 50 provides what is known as direct injection of fuel into combustion chamber 29. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 29 may alternatively, or additionally, include a fuel injector arranged in intake manifold 44 in a configuration that provides what is known as port injection of fuel into the intake port upstream from each combustion chamber 29.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 29 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gasses from cylinders 29. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof. While not shown in FIG. 2, it will be appreciated that a similarly-configured intake air sensor may be included in engine 10 (e.g., coupled to intake passage 42) to enable sensing of intake gas AFR. As with exhaust gas sensor 128, the intake air sensor may be any suitable sensor for providing an indication of intake gas AFR such as a linear oxygen sensor or UEGO, a two-state oxygen sensor or EGO, a HEGO, a $NO_x$, HC, or CO sensor, for example Exhaust temperature may be measured by one or more temperature sensors (not shown) located in exhaust passage 48. Alternatively, exhaust temperature may be inferred based on engine operating conditions such as speed, load, AFR, spark retard, etc.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 39; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 39. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 25 for diverting exhaust gas away from turbine 62. In some embodiments, wastegate 25 may be a multi-staged wastegate, such as a two-staged wastegate with a first stage configured to control boost pressure and a second stage configured to increase heat flux to emission control device 78. Wastegate 25 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 25 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gasses. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 2 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIG. 3 shows a schematic view of an example embodiment of an oxygen sensor 300 configured to measure a concentration of oxygen ($O_2$) in an intake airflow in an intake passage or in an exhaust gas stream in an exhaust passage. In some examples, the sensor 300 may be a UEGO sensor. The sensor 300 may correspond to exhaust gas sensor 128 of FIG. 1, for example, though sensor 128 may deviate in some respects from the sensor 300—for example, sensor 128 may employ one or more modifications.

As shown in FIG. 3, the sensor 300 comprises a plurality of layers of one or more ceramic materials arranged in a stacked configuration. In the embodiment of FIG. 3, five ceramic layers are depicted as layers 301, 302, 303, 304, and 305. These layers include one or more layers of a solid electrolyte capable of conducting ionic oxygen. Examples of suitable solid electrolytes include, but are not limited to, zirconium oxide-based materials. Further, in some embodiments, a heater 307 may be disposed in thermal communication with the layers to increase the ionic conductivity of the layers. While the depicted oxygen sensor is formed from five ceramic layers, it will be appreciated that the oxygen sensor may include other suitable numbers of ceramic layers.

The layer 302 includes one or more materials creating a diffusion path 310. The diffusion path 310 is configured to introduce gasses into a first internal cavity 322 via diffusion. The diffusion path 310 may be configured to allow one or more components of intake air or exhaust gasses, including but not limited to a desired analyte (e.g., $O_2$), to diffuse into internal cavity 322 at a more limiting rate than the analyte can be pumped in or out by a pumping electrodes pair 312 and 314. In this manner, a stoichiometric level of $O_2$ may be obtained in the first internal cavity 322.

The sensor 300 further includes a second internal cavity 324 within the layer 304 separated from the first internal cavity 322 by the layer 303. The second internal cavity 324 is configured to maintain a constant oxygen partial pressure equivalent to a stoichiometric condition; e.g., an oxygen level present in the second internal cavity 324 is equal to that which the intake air or exhaust gas would have if the air-fuel ratio were stoichiometric. The oxygen concentration in the second internal cavity 324 is held constant by pumping voltage $V_{cp}$. Herein, the second internal cavity 324 may be referred to as a reference cell.

A pair of sensing electrodes 316 and 318 is disposed in communication with the first internal cavity 322 and the reference cell 324. The sensing electrodes pair 316 and 318 detects a concentration gradient that may develop between the first internal cavity 322 and the reference cell 324 due to an oxygen concentration in the intake air or exhaust gas that is higher than or lower than the stoichiometric level. A high oxygen concentration may be caused by a lean intake air or exhaust gas mixture, while a low oxygen concentration may be caused by a rich mixture.

A pair of pumping electrodes 312 and 314 is disposed in communication with the internal cavity 322, and is configured to electrochemically pump a selected gas constituent (e.g., $O_2$) from internal cavity 322 through layer 301 and out of the sensor 300. Alternatively, the pair of pumping electrodes 312 and 314 may be configured to electrochemically pump a selected gas through layer 301 and into internal cavity 322. Herein, the pumping electrodes pair 312 and 314 may be referred to as an $O_2$ pumping cell.

The electrodes 312, 314, 316, and 318 may be made of various suitable materials. In some embodiments, the electrodes 312, 314, 316, and 318 may be at least partially made of a material that catalyzes the dissociation of molecular oxygen. Examples of such materials include, but are not limited to, electrodes containing platinum and/or silver.

The process of electrochemically pumping the oxygen out of or into the internal cavity 322 includes applying a voltage $V_p$ across the pumping electrode pair 312 and 314. The pumping voltage $V_p$ applied to the $O_2$ pumping cell pumps oxygen into or out of the first internal cavity 322 in order to maintain a stoichiometric level of oxygen in the cavity pumping cell. The resulting pumping current $I_p$ is proportional to the concentration of oxygen in the exhaust gas. A suitable control system (not shown in FIG. 3) generates the pumping current signal $I_p$ as a function of the intensity of the applied pumping voltage $V_p$ required to maintain a stoichiometric level within the first internal cavity 322. Thus, a lean mixture will cause oxygen to be pumped out of the internal cavity 322 and a rich mixture will cause oxygen to be pumped into the internal cavity 322.

In addition to measuring the concentration of oxygen in a gas stream, oxygen sensor 300 may be used to determine ambient humidity. Knowledge of ambient humidity may be desired, as various operational aspects of an engine may be based on a determination of ambient humidity; without adapting these operational aspects to ambient humidity, engine performance and fuel economy may be degraded while emissions increase, for example. In particular, increases in the water concentration of ambient air surrounding a vehicle may dilute a charge mixture delivered to the cylinders of an engine, in turn affecting engine operating parameters such as EGR, spark timing, and AFR. As such, one or more of these engine operating parameters, and/or potentially others, may be adapted to the ambient humidity determined via oxygen sensor 300.

In one example, oxygen sensor 300 may be operated to determine ambient humidity during engine non-fueling conditions such as DFSO. During engine non-fueling conditions, closure of an intake throttle may generate a large intake manifold vacuum which can draw in positive crankcase ventilation (PCV) hydrocarbons. Ingested PCV hydrocarbons can affect the output of an oxygen sensor and confound humidity measurements performed therewith—for example, the presence of PCV hydrocarbons may lead to an overestimation of ambient humidity. Accordingly, an intake throttle of an associated engine (e.g., throttle 21 of FIG. 1) may be opened while oxygen sensor 300 is operated to determine ambient humidity to reduce ingestion of PCV hydrocarbons. The intake throttle may be opened various suitable amounts—e.g., the throttle may be fully opened, while in another example the throttle may be opened by at least 15 degrees. In some approaches, an optimal intake throttle opening amount may be determined by performing humidity measurement at different throttle openings. The throttle opening above which the humidity measurement does not change significantly may be selected as the optimal throttle opening for minimizing PCV hydrocarbon effects.

With the intake throttle open, oxygen sensor 300 may be operated with a reference voltage that is modulated. For example, the voltage (e.g., $V_p$) applied to pumping cell 328 may be modulated between a first, lower voltage and a second, higher voltage. When operating oxygen sensor 300 with the lower voltage, a first pumping current output by the sensor may be recorded—e.g., the pumping current $I_p$ output by pumping cell 328. Then, oxygen sensor 300 may be operated with the higher voltage, and a second pumping current output by the sensor may be recorded. As non-limiting examples, the first, lower voltage may be 450 mV while the second, higher voltage may be 1080 mV. The first pumping current, obtained as a result of applying the first, lower voltage, may be indicative of an amount of oxygen in a gas stream. The second pumping current, obtained as a result of applying the second, higher voltage, may be indicative of the amount of oxygen in the gas stream plus an amount of oxygen from dissociated water molecules, as such water molecules may dissociate at the higher voltage. Accordingly, an indication of ambient humidity may be obtained based on the difference between the first and second pumping currents. For example, the first pumping current may be subtracted from the second pumping current, and this difference may be multiplied by a constant relating pumping current to humidity. In some examples, the oxygen sensor voltage may be modulated two or more times to determine two or more delta pumping currents, with the two or more delta pumping currents being averaged to determine an average delta pumping current. This may mitigate or obviate the effect of changing air fuel ratio at the beginning of a fuel shut off duration when residual combustion gases may be present in a gas stream.

Other approaches may be employed to determine ambient humidity with oxygen sensor 300. For example, ambient humidity detection may be initiated during non-fueling conditions such as DFSO and after the intake throttle of an associated engine has been opened to reduce the effects of PCV hydrocarbons as described above. The oxygen sensor 300 may be operated in a non-variable voltage mode where a reference voltage of the sensor is not modulated. Instead, the reference voltage of the oxygen sensor 300 may be maintained at a lower, base reference voltage (e.g., such as 450 mV). Then, the instant pumping current output by oxygen sensor 300 (e.g., the pumping current $I_p$ of pumping cell 328) may be measured and compared to a dry air pumping current. "Dry air pumping current" as used herein may refer to the pumping current output by oxygen sensor 300 when fed a gas stream in which water is fully dissociated—e.g., air having 0% humidity. The dry air pumping current may be determined based on two pumping currents resulting from operating oxygen sensor 300 at two respective, different reference voltages (e.g., when operating the oxygen sensor 300 in a variable voltage mode). For example, the dry air pumping current may be determined according to the following relation: $I_{pdry}=(I_{plow}*K_1)+(I_{phi}*K_2)$, where $I_{pdry}$ is the dry air pumping current, $I_{plow}$ is the pumping current corresponding to a first, lower voltage (e.g., 450 mV) that may be indicative of an amount of oxygen in a gas stream, $I_{phi}$ is the pumping current corresponding to a second, higher voltage (e.g., 1080 mV) that may be indicative of the amount of oxygen in the gas stream plus an amount of oxygen from dissociated water molecules, and $K_1$ and $K_2$ are constants which may respectively assume the values of 0.6 and 0.4, for example. In some examples, the dry air pumping current may be determined once per vehicle drive cycle—e.g., upon startup. Having determined the dry air pumping current, a difference between the instant pumping current and dry air pumping current may be determined, and the difference multiplied by a constant that relates pumping current to humidity to thereby determine the ambient humidity.

It should be appreciated that the oxygen sensor 300 described herein is merely an example embodiment of an oxygen sensor, and that other embodiments of oxygen sensors may have additional and/or alternative features and/or designs.

FIG. 4 shows a flowchart illustrating a method 400 of determining ambient humidity via an oxygen sensor. Method 400 may be employed in combination with oxygen sensor 300 to determine ambient humidity, for example.

At 402 of method 400, it is determined whether an engine is operating under non-fueling conditions. Non-fueling conditions may include engine operating conditions in which fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake passage to the exhaust passage. In this way, humidity measurement may be performed based on readings output by the oxygen sensor without being confounded by PCV hydrocarbons, for example. Accordingly, at least one engine cylinder may be said to be "deactivated" during non-fueling conditions. The at least one engine cylinder may be reactivated by resuming the supply of fuel to the cylinder and combustion therein under suitable conditions.

Non-fueling conditions may include, for example, deceleration fuel shut off (DFSO). DFSO may be responsive to an accelerator pedal, and may occur repeatedly during a drive cycle. As such, numerous indications of ambient humidity may be generated throughout the drive cycle, such as during each DFSO event. As such, the overall efficiency of the engine may be maintained during driving cycles in which the ambient humidity fluctuates. The ambient humidity may fluctuate due to a change in altitude or temperature or when the vehicle enters/exits fog or rain, for example.

If it is determined that the engine is not operating under non-fueling conditions (NO), method 400 ends. If it is determined that the engine is operating under non-fueling conditions (YES), method 400 proceeds to 404.

At 404 of method 400, an intake throttle of the engine is opened. As described above, the intake throttle may be opened to reduce or obviate confounding effects of PCV hydrocarbons on humidity measurements performed via the oxygen sensor. The intake throttle may be opened various suitable amounts, including but not limited to full opening, 15 degrees, or a determined opening above which humidity measurement does not significantly change. Consequently, the engine may be operated under relatively high load due to opening of the intake throttle. The relatively high load may be above an upper threshold—e.g., 70% in some examples.

At 406 of method 400, the reference voltage supplied to the oxygen sensor is modulated. Modulating the reference voltage may include, at 408, reading a first pumping current resulting from application of a first, lower reference voltage (e.g., 450 mV). As described above, the first pumping current may be indicative of an amount of oxygen in a gas stream. Modulating the reference voltage may include, at 410, reading a second pumping current resulting from application of a second, higher reference voltage (e.g., 1080 mV). As described above, the second pumping current may be indicative of the amount of oxygen in the gas stream plus an amount of oxygen from dissociated water molecules.

In some examples, the reference voltage supplied to the oxygen sensor may be modulated two or more times. For example, during a DFSO event with the intake throttle open, the modulating may be performed for a duration, and a change in pumping current at each modulation may be learned. Then, the learned values may be averaged and the ambient humidity determined based on the average pumping current change as described in further detail below.

In some implementations, the oxygen sensor reference voltage may be modulated responsive to the duration of non-fueling conditions. Specifically, the reference voltage may be modulated if a duration (e.g., a time, number of engine cycles, etc.) since fuel shut-off is not greater than or equal to a threshold duration, and may not be modulated if the duration since fuel shut-off is greater than the threshold duration. The threshold duration may be an amount of time until an exhaust gas stream is substantially free of hydrocarbons resulting from combustion in the engine. In this way, reference voltage modulation, and humidity measurements based thereon, may be based on ambient air that lacks a significant concentration of hydrocarbons.

At 412 of method 400, the dry air pumping current of the oxygen sensor may optionally be determined. As described above, the dry air pumping current may be the pumping current output by the oxygen sensor when fed a gas stream in which water is fully dissociated. The dry air pumping current may be determined based on the first pumping current read at 408 and the second pumping current read at 410. In particular, the dry air pumping current may be determined according to the following relation: $I_{pdry} = (I_{p1}*K_1)+(I_{p2}*K_2)$, where $I_{pdry}$ is the dry air pumping current, $I_{p1}$ is the first pumping current which may be indicative of an amount of oxygen in a gas stream, $I_{p2}$ is the second pumping current which may be indicative of the amount of oxygen in the gas stream plus an amount of oxygen from dissociated water molecules, and $K_1$ and $K_2$ are constants which may respectively assume the values of 0.6 and 0.4, for example. In some examples, the dry air pumping current may be determined once per vehicle drive cycle—e.g., upon startup.

At 414 of method 400, the instant pumping current of the oxygen sensor may optionally be determined. The instant pumping current may be the pumping current output by a pumping cell of the oxygen sensor, for example, and may at least partially be a function of the instant ambient humidity. In some examples, the instant pumping current may correspond to application of a lower, base reference voltage to the oxygen sensor at which water molecules are not dissociated in a gas stream (e.g., 450 mV).

At 416 of method 400, the ambient humidity is determined. Determining the ambient humidity may include, at 418, determining the ambient humidity based on a difference between the first and second pumping currents respectively read at 408 and 410. Since the second pumping current may be indicative of the amount of oxygen in the exhaust gas plus an amount of oxygen from dissociated water molecule, while the first pumping current may be indicative of the amount of oxygen in the exhaust gas, the difference between the first and second pumping currents may be indicative of the ambient humidity. As described above, in some examples, the reference voltage supplied to the oxygen sensor may be modulated two or more times, in which case the ambient humidity may be determined at 418 based on an average difference between first and second pumping currents. Regardless of whether it is or is not an average, the pumping current difference may be multiplied by a constant relating pumping current to humidity to yield an indication of the ambient humidity—e.g., a humidity concentration percentage.

Determining the ambient humidity may alternatively include, at 420, determining the ambient humidity based on the dry air pumping current and the instant pumping current respectively determined at 412 and 414, if both were determined. Since the instant pumping current may be indicative of instant ambient humidity, while the dry air pumping current may be indicative of zero-humidity conditions, the difference between the instant and dry air pumping currents may yield an indication of the ambient humidity. The difference between the instant and dry air pumping currents may be multiplied by a constant relating pumping current to humidity to yield this indication of the ambient humidity—e.g., a humidity concentration percentage.

While using the difference between dry air pumping current and instant pumping current is described as an alternative to using the difference between the first and second pumping currents in the above-described implementation, it will be appreciated that, in other implementations, both approaches may be utilized to determine ambient humidity.

Issues may arise when a transmission shift is desired while performing humidity detection with an oxygen sensor. Specifically, performing a shift wile an engine is operating under high load (e.g., due to opening of the intake throttle to reduce PCV hydrocarbon presence according to method 400) may reduce vehicle drivability and produce NVH. Air residing in engine cylinders may generate negative torque that impedes shifting, for example.

FIG. 5 shows a flowchart illustrating a method 500 of controlling operation of an engine responsive to transmission shifts during DFSO. In one example, method 500 includes reducing engine load while operating under DFSO in response to an incoming transmission shift. Method 500 may be employed to control engine 10 of FIG. 2 in combination with transmission 30 of FIG. 1 and oxygen sensor 300 of FIG. 3, for example.

At 502 of method 500, it is determined whether engine operating conditions are suitable for initiating DFSO. During DFSO, the engine may be operated without fuel injection while rotating and pumping air through the cylinders. In some examples, one or more of vehicle speed, vehicle acceleration, engine speed, engine load, throttle position, pedal position, transmission gear position, and various other parameters may be used to determine whether DFSO is to be initiated. In one example, DFSO may be initiated if engine speed is below a threshold speed. In another example, DFSO may be initiated if engine load is below a threshold. In still another example, DFSO may be initiated based on an accelerator pedal position and/or a change in the accelerator pedal position in a suitable duration—e.g., DFSO may be initiated if a threshold change in the accelerator position indicating driver tip-out has occurred. Additionally or alternatively, entry into DFSO may be determined based on a commanded signal to cease fuel injection. If it is determined that engine operating conditions are not suitable for initiating DFSO (NO), method 500 ends. If it is determined that engine operating conditions are suitable for initiating DFSO (YES), method 500 proceeds to 504.

At 504 of method 500, DFSO is initiated, for example by ceasing fuel injection to the engine, and in some examples ceasing spark ignition for spark-ignited engines.

At 506 of method 500, it is determined whether engine operating conditions are suitable for initiating humidity detection via an oxygen sensor. In some examples, humidity detection may be initiated if DFSO has been engaged for at least a threshold duration. The threshold duration may be a duration after which hydrocarbons resulting from fuel combustion are substantially absent from a gas stream received by the oxygen sensor. In other examples, humidity detection may be initiated if the engine is operating under non-fueling conditions and at least one intake valve and at least one exhaust valve of an engine cylinder are open. If it is determined that engine operating conditions are not suitable for initiating humidity detection (NO), method 500 ends. If it is determined that engine operating conditions are suitable for initiating humidity detection (YES), method 500 proceeds to 508.

At 508 of method 500, humidity detection via the oxygen sensor is initiated. Humidity detection may include measuring the ambient humidity via the oxygen sensor according to method 400 of FIG. 4. As such, initiation of humidity detection may include opening an intake throttle of the engine to reduce or obviate PCV hydrocarbon presence as described above. Detection of ambient humidity may be referred to as a diagnostic. In other embodiments, a diagnostic other than ambient humidity detection may be performed with the engine operating under relatively high load and non-fueling conditions.

At 510 of method 500, an incoming transmission shift is predicted. Predicting an incoming transmission shift may include, at 512, determining whether a shift request flag has been set. As described above, a controller (e.g., controller 12 of FIG. 1) may set the shift request flag upon determining that the transmission is to be shifted. As such, the flag indicates an incoming shift. Because a delay may exist between setting of the flag and the actual transmission shift, enough time may be provided for performing actions that address the issues described above which might otherwise result from performing the shift while the engine is operating under high load due to opening of the intake throttle. If it is determined that the shift request flag has been set (YES), method 500 proceeds to 518. If it is determined that the shift request flag has not been set (NO), method 500 proceeds to 514. In this case, method 500 evaluates other criteria to predict an incoming shift.

At 514 of method 500, one or more operator pedals are observed. For example, changes in a break pedal position above a threshold in a suitable duration may cause an incoming shift to be predicted. Alternatively or additionally, changes in an accelerator pedal position above a threshold in a suitable duration may cause an incoming shift to be predicted.

At 516 of method 500, vehicle acceleration is observed. In one example, vehicle acceleration (or deceleration) above a threshold in a suitable duration may prompt prediction of an incoming shift.

At 518 of method 500, it is determined whether an incoming transmission shift is predicted to occur during the humidity detection initiated at 508. The shift may be predicted depending on one or more of the criteria described above that may be evaluated to predict a shift—e.g., whether or not the shift request flag has been set, observation of one or more operator pedals and/or vehicle acceleration. If it is determined that an incoming shift is not predicted to occur during the humidity detection (NO), method 500 proceeds to 520 where the humidity detection is completed according to method 400 of FIG. 4. At 522 of method 500, nominal engine operation is resumed, which may include exiting engine operation under non-fueling conditions, resuming fuel supply and combustion in the engine, and in some examples reducing the opening of the intake throttle. Following 522, method 500 ends. If it is determined that an incoming shift is predicted to occur during the humidity detection (YES), method 500 proceeds to 524.

At 524 of method 500, the humidity detection initiated at 508 is cancelled responsive to the predicted transmission shift. In particular, the humidity detection is terminated before completion of a duration in which the humidity is detected. Here, the relatively high load conditions under which the engine is operating, selected to increase the integrity of the humidity detection, are exited, as they are unsuitable for execution of the incoming shift due to the reasons described above. Cancellation of the humidity detection may include returning to nominal control of the oxygen sensor used to perform the humidity detection; this may include altering the voltage at which the sensor is operated from a first, lower or a second, higher reference voltage to a third, different voltage, for example. In some examples, a cancelled humidity detection may be resumed at the point at which it was terminated upon subsequent occurrence of suitable conditions for the humidity detection. As such, cancellation in this context may refer to pausing the humidity detection to be later resumed. For example, a partially completed humidity detection may be cancelled due to an incoming transmission shift during the humidity detection. After completion of the shift, non-fueling conditions such as DFSO may occur and the humidity detection may be resumed at the point at which it was cancelled. In a first duration, for example, a first pumping current corresponding to operating the oxygen sensor with the first, lower reference voltage may be read. A shift may then occur, prompting cancellation of the humidity detection. Following completion of the shift and occurrence of non-fueling conditions, the humidity detection may be resumed by reading a second pumping current corresponding to operating the oxygen sensor with the second, higher reference voltage. The ambient humidity may be determined based on the difference between the first and second pumping currents as described above. In another example, the reference voltage with which the oxygen sensor is operated may be modulated two or more times in a first duration, with the resulting pumping current being read at each modulation. In a second duration, following pause of the humidity detection, the reference voltage may be modulated two or more times again, with the resulting pumping current being read at each modulation, until a desired number of modulations is reached such that an average change in pumping current based on a desired number of samples is read. In yet another example, the dry air pumping current of the oxygen sensor may be determined in a first duration. In a second duration, following pause of the humidity detection, the instant pumping current may be determined, and the ambient humidity determined based on the dry air and instant pumping currents as described above.

In some examples, method 500 may accordingly include resuming a prior humidity detection at 508 rather than initiating a new humidity detection, in order to complete the prior humidity detection. The prior humidity detection may be resumed from the point where the diagnostic was terminated. It will be appreciated, however, that in other examples cancellation of humidity detection may not pause the humidity detection—e.g., if the humidity detection is not completed, it is restarted from the beginning upon subsequent occurrence of suitable conditions for the detection. In this case, aspects of engine operation that assess ambient humidity may use a previously-determined ambient humidity to compensate for cancellation of humidity detection, for example.

At 526 of method 500, the opening of the engine intake throttle is reduced. As described above, reduction of the intake throttle opening may reduce engine load and reduce or obviate NVH and/or drivability issues that may otherwise occur as a consequence of performing a shift while operating the engine under high load conditions due to relatively high opening of the intake throttle. The intake throttle opening may be reduced in various suitable amounts which may be predetermined or in other examples adapted to the particular incoming shift (e.g., based on which gears are being shifted from/to).

At 528 of method 500, the engine is restarted. Restarting the engine may include resuming supply of fuel to the engine cylinders and combustion therein.

At 530 of method 500, the transmission shift is performed. In this way, the NVH and/or drivability issues described above may be reduced or obviated by reducing engine load in anticipation of the shift. Following 530, method 500 ends.

It will be appreciated that, in some examples, conditions other than an incoming transmission shift may prompt cancellation of humidity detection. For example, exit from DFSO, if engaged, and not necessarily a transmission shift, may cause cancellation of humidity detection. DFSO exit may be prompted by a signal sent to the engine commanding fuel injection, driver tip-in, vehicle speed reaching a threshold value, and/or engine load reaching a threshold value, for example.

In some implementations, results of the ambient humidity detection (and/or other diagnostics) may be indicated to a vehicle operator. In some examples, these results may be indicated to the operator only when the diagnostic is completed. In other examples, these results may be indicated to the operator upon cancellation of the diagnostic. Indicating diagnostic results may include conveying information via one or more dashboard indicators and/or setting one or more diagnostic codes, for example.

Various aspects of engine operation may be based at least partially on ambient humidity. For example, engine operating parameters such as EGR, spark timing, and AFR may be affected by fluctuations of the water concentration in ambient air and as such may be adjusted in view of ambient humidity assessment. In one example embodiment, an amount of EGR may be adjusted based on the measured ambient humidity. For example, in one condition, the water concentration in the air surrounding the vehicle may have increased due to a weather condition such as fog; thus, a higher humidity is detected by the exhaust gas sensor during engine non-fueling conditions. In response to the increased humidity measurement, during subsequent engine fueling operation, the EGR flow into at least one combustion chamber may be reduced. Specifically, EGR flow may be increased or decreased in only one combustion chamber, in some combustion chambers, or in all combustion chambers. Furthermore, the magnitude of change of the EGR flow may be the same for all cylinders or the magnitude of change of the EGR flow may vary by cylinder based on the specific operating conditions of each cylinder.

In another embodiment, spark timing may be adjusted responsive to the ambient humidity. In at least one condition, for example, spark timing may be advanced in one or more cylinders during subsequent engine fueling operation responsive to a higher humidity reading. Spark timing may be scheduled so as to reduce knock in low humidity conditions (e.g., retarded from a peak torque timing), for example. When an increase in humidity is detected, spark timing may be advanced in order to maintain engine performance and operate closer to or at a peak torque spark timing. Additionally, spark timing may be retarded in response to a decrease in ambient humidity. For example, a decrease in ambient humidity from a higher humidity may cause knock. If the decrease in humidity is detected during non-fueling conditions, such as DFSO, spark timing may be retarded during subsequent engine fueling operation and knock may be reduced. It should be noted that spark may be advanced or retarded in one or more cylinders during subsequent engine fueling operation. Further, the magnitude of change of spark timing may be the same for all cylinders or one or more cylinders may have varying magnitudes of spark advance or retard.

In still another example embodiment, exhaust gas air fuel ratio may be adjusted responsive to the measured ambient humidity during subsequent engine fueling operation. For example, an engine may be operating with a lean air fuel ratio optimized for low humidity. In the event of an increase in humidity, the mixture may become diluted, resulting in engine misfire. If the increase in humidity is detected during non-fueling conditions, however, the air fuel ratio may be adjusted so that the engine will operate with a less lean, lean air fuel ratio during subsequent fueling operation. Likewise, an air fuel ratio may be adjusted to be leaner during subsequent engine fueling operation in response to a measured decrease in ambient humidity. In this way, conditions such as engine misfire due to humidity fluctuations may be reduced.

In some examples, an engine may be operating with a stoichiometric air fuel ratio or a rich air fuel ratio. As such, the air fuel ratio may be independent of ambient humidity and measured fluctuations in humidity may not result in an adjustment of air fuel ratio.

FIG. 6 shows a graph 600 of an exemplary drive cycle. Graph 600 may particularly illustrate operation of an engine according to method 500 of FIG. 5, for example.

Upon initiation of the drive cycle, engine load gradually increases in response to driver actuation of an accelerator pedal, whose position is shown as increasing during the initial portion of the drive cycle. The driver then initiates a tip-out and actuates the brake pedal. In response, engine load decreases until a time $t_1$ at which the engine is operated under non-fueling conditions (e.g., DFSO). The non-fueling conditions prompt humidity detection via an oxygen sensor (e.g., according to method 400 of FIG. 4, which includes increasing the engine load to a relatively high load (e.g., by increasing the opening of an intake throttle). During DFSO and humidity detection, a transmission shift request flag is set, indicating an incoming transmission shift. In response to detecting that the flag has been set, engine load is reduced (e.g., by reducing the intake throttle opening) to a relatively lower load. At a time $t_2$, DFSO ceases, engine fueling is reengaged, and the shift indicated by the flag is performed. Following time $t_2$, nominal engine operation is resumed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an internal combustion engine, comprising:
   deactivating at least one engine cylinder;
   performing a diagnostic while the at least one engine cylinder is deactivated and while the engine is operating under high load;
   predicting a transmission shift; and
   responsive to the predicted transmission shift, reducing engine load below the high load and terminating the diagnostic, wherein predicting the transmission shift includes observing vehicle acceleration, and wherein reducing the engine load below the high load includes reducing an intake throttle opening.

2. The method of claim 1, wherein predicting the transmission shift further includes determining whether a transmission shift request flag has been set in an engine controller, the flag indicating whether the transmission shift will occur.

3. The method of claim 1, wherein predicting the transmission shift further includes observing a position of one or both of an accelerator pedal and a brake pedal.

4. The method of claim 1, wherein the at least one engine cylinder is deactivated responsive to deceleration fuel shut-off.

5. The method of claim 1, further comprising responsive to reducing the engine load below the high load and terminating the diagnostic, reactivating the at least one engine cylinder.

6. The method of claim 1, wherein the diagnostic detects ambient humidity via an oxygen sensor.

7. The method of claim 6, wherein the oxygen sensor is an intake gas oxygen sensor.

8. The method of claim 6, further comprising adjusting one or more engine operating parameters based on the detected ambient humidity.

9. The method of claim 1, further comprising responsive to reducing the engine load below the high load and terminating the diagnostic, performing the predicted transmission shift.

10. An engine method, comprising:
    while operating an engine with a cylinder deactivated and engine load above an upper threshold, generating a diagnostic based on operating conditions over a duration;
    responsive to a predicted transmission shift occurring before a completion of the duration, terminating the diagnostic; and
    indicating to an operator results of the diagnostic only when the diagnostic is completed.

11. The engine method of claim 10, further comprising responsive to occurrence of the predicted transmission shift, while operating the engine with the cylinder deactivated and the engine load above the upper threshold, completing the diagnostic.

12. The engine method of claim 11, wherein completing the diagnostic includes resuming the diagnostic from where the diagnostic was terminated.

13. The engine method of claim 11, wherein completing the diagnostic includes restarting the diagnostic.

14. The engine method of claim 10, wherein the diagnostic detects ambient humidity via an oxygen sensor.

15. An engine method, comprising:
    deactivating at least one engine cylinder responsive to deceleration fuel shut-off;
    opening an intake throttle of an engine;
    detecting ambient humidity via an oxygen sensor with the at least one engine cylinder deactivated and the intake throttle opened; and
    ceasing ambient humidity detection responsive to predicting a transmission shift with the at least one engine cylinder deactivated and the intake throttle opened.

16. The engine method of claim 15, wherein predicting the transmission shift includes determining whether a transmission shift request flag has been set in an engine controller, the flag indicating whether the transmission shift will occur.

17. The engine method of claim 15, further comprising:
closing the intake throttle of the engine responsive to predicting the transmission shift;
performing the transmission shift; and
completing the ambient humidity detection with the at least one engine cylinder deactivated and the intake throttle opened.

18. The engine method of claim 17, further comprising adjusting one or more engine operating parameters based on the completed ambient humidity detection.

19. A method of operating an internal combustion engine, comprising:
deactivating at least one engine cylinder;
performing a diagnostic while the at least one engine cylinder is deactivated and while the engine is operating under high load;
predicting a transmission shift; and
responsive to the predicted transmission shift, reducing engine load below the high load and terminating the diagnostic, wherein reducing the engine load below the high load includes reducing an intake throttle opening.

20. A method of operating an internal combustion engine, comprising:
deactivating at least one engine cylinder;
performing a diagnostic while the at least one engine cylinder is deactivated and the engine operates under high load;
predicting a transmission shift;
responsive to the predicted transmission shift, reducing engine load below the high load and terminating the diagnostic; and
responsive to reducing the engine load below the high load and terminating the diagnostic, performing the predicted transmission shift.

* * * * *